United States Patent [19]
Oliver et al.

[11] 3,720,431
[45] March 13, 1973

[54] LATCH FOR FARM GATES

[75] Inventors: Norman J. Oliver; Virgil Hardie, both of Sioux Falls; Ludwig Camp, Worthing, all of S. Dak.

[73] Assignee: Sioux Steel Company, Sioux Falls, S. Dak.

[22] Filed: June 1, 1971

[21] Appl. No.: 148,795

[52] U.S. Cl. ..................................292/264, 24/116 R
[51] Int. Cl. ................................................E05c 17/36
[58] Field of Search .......................292/264; 24/116

[56] References Cited

UNITED STATES PATENTS 2,908,529    10/1959    Davidson..........................292/264 X

FOREIGN PATENTS OR APPLICATIONS 702,094    1/1965    Canada...............................24/116 R
226,648    10/1958    Australia...............................292/264

Primary Examiner—Richard E. Moore
Attorney—Molinare, Allegretti, Newitt & Witcoff

[57] ABSTRACT

A latch plate, for mounting on the free end of a farm gate or the like, having a slot for the reception of a link of a section of link chain, with the chain surrounding a gate post, for detachably securing the gate in closed position.

3 Claims, 4 Drawing Figures

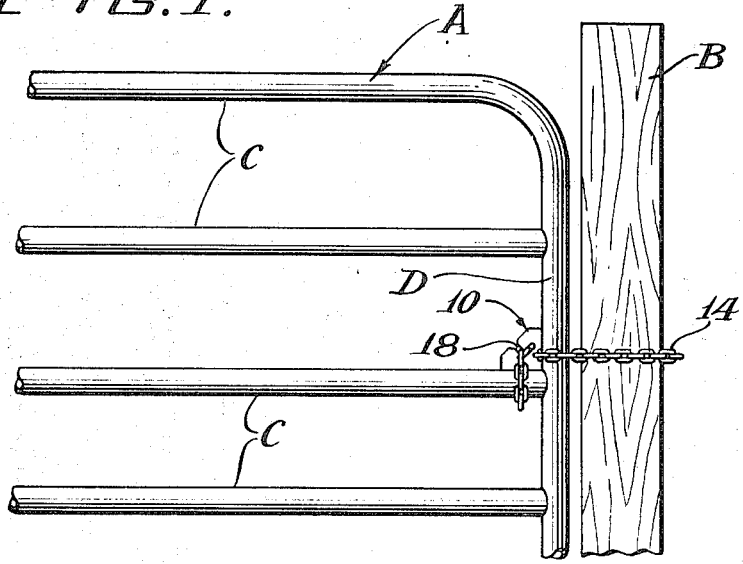
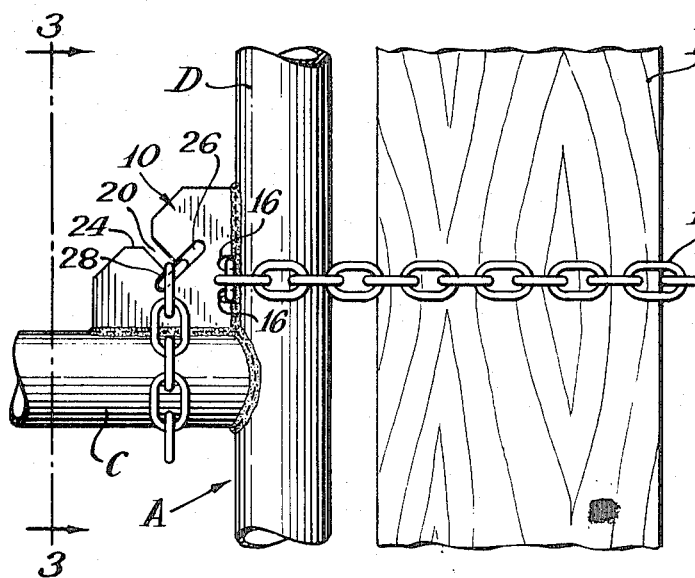
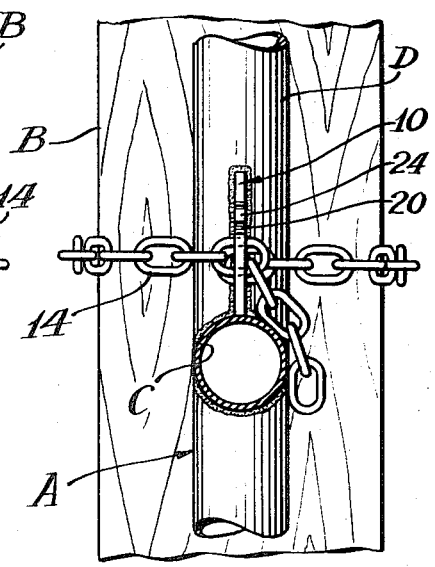
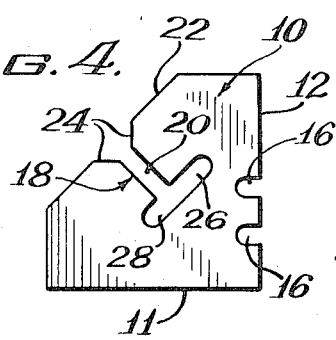

LATCH FOR FARM GATES

BACKGROUND OF THE INVENTION

This invention relates to a latch plate for securement to the free end of a farm gate or the like, and which is constructed and arranged for use with a section of link chain for detachably securing the gate in closed position.

As is well known, farm gates are necessarily of rugged construction so as to withstand the impact of various portions of the bodies of animals confined in an enclosure of which the gate forms a part. It is also well known that certain animals, such as cattle and hogs, frequently rub their noses or snouts against the latching structure of the gate, causing accidental release of the latching structure, resulting in the gate being opened by the animals and permitting their escape from the enclosure. Heretofore there have been devised and used many different types of latching structures for farm gates, which in the main have not been totally satisfactory for various reasons. Some of them have not been found satisfactory due to their failure to provide relatively positive securement of the gate in closed position in that the latching means frequently could be released by rubbing contact therewith by portions of the bodies of the animals. Other arrangements have been found unsatisfactory because parts frequently become loose and fall in the mud or on the ground, and sometimes become lost or damaged. Still other latching arrangements were found to be awkward or inconvenient and time-consuming to use, such as an arrangement utilizing a section of link chain for surrounding a gate post and an upright member of the free end of the gate, and securing portions of the chain together by means of a padlock.

One of the objects of this invention is to provide a novel latch plate construction, adapted to be fixedly attached to a gate at its free end, and which is formed for cooperative use in connection with a section of link chain in a manner to preclude accidental disengagement of the chain from the latch plate.

Another object is to provide a novel latch plate structure of the character indicated, which is of simple, rugged and inexpensive construction, and wherein no parts thereof can become loose or lost.

A further object is to provide a novel latch plate structure of the character indicated in which it is convenient and easy to manipulate a link of a section of link chain into and out of operative position in the plate and which is capable of securely latching a gate in a closed position.

Other objects and advantages of this invention will be apparent from the following description, taken in connection with the accompanying drawing.

BRIEF DESCRIPTION OF THE DRAWING

FIG. 1 is a fragmentary, elevational view of a free end portion of a gate, secured to a gate post by the latching structure embodying the present invention;

FIG. 2 is an enlarged, fragmentary, elevational view of a portion of a gate and gate post showing the novel latch plate mounted on the free end portion of the gate, with a section of link chain connected to the latch plate for detachably securing the gate in closed position;

FIG. 3 is a fragmentary view, part in section, taken at line 3—3 on FIG. 2; and

FIG. 4 is a plan view of the latch plate embodying the present invention, shown at a further slightly enlarged scale.

DESCRIPTION OF THE PREFERRED EMBODIMENT

As is well known, enclosures for various farm animals, such as cattle and hogs, are formed of suitable fencing materials, and are usually provided with an opening at each end of which is mounted a gate post for accommodating a gate therebetween. Such farm gates are formed of various heights and lengths, depending upon the nature of use. One end of the gate (not shown) is pivotally mounted by means of hinge connectors to a gate post so that the gate proper may be swung to open or closed position, and in the latter position the free end of the gate is positioned in close proximity to the other gate post.

As seen in FIG. 1 of the drawing, only a fragmentary portion of the free end of a gate, indicated at A, is shown in relation to a gate post B. The gate, as shown, comprises a plurality of horizontally extending structural members C and a plurality of vertical structural members D. The gate, as shown, is formed of metal tubing and the vertical member D, at the free end of the gate, is formed as a continuation of the top horizontal member C. The structural members are all welded together to form a relatively strong and rigid construction. If the gate is of substantial length, preferably intermediate vertical, structural members are utilized for interconnecting all of the horizontal members.

The latch plate embodying the present invention, and as indicated at 10, is formed of a metal plate and is provided with a pair of mounting edges 11 and 12, which are at substantially right angles to each other, so that the plate can be seated and secured in a corner formed by one of the horizontal gate members C, and the upright member D at the free end of the gate, as by welding, as seen in FIGS. 1, 2, and 3 of the drawing. Cooperating with the latch plate for detachably securing the gate in closed position is a section of link chain, as indicated at 14. One of the mounting edges of the latch plate is formed with a pair of spaced apart notches, as indicated at 16, for accommodating a pair of spaced apart legs of a link of the chain (preferably as shown, an end or initial link), prior to the securement of the mounting plate 10 in fixed relation to the structural members of the gate, so that the section of link chain is always permanently attached in relation to the gate and latch plate.

The latch plate is formed with a partially inverted T-shaped slot 18, with the free end of the center leg 20 of the slot opening at a free edge 22 of the latch plate. The free edge portion 22 is cut away to provide bevelled portions 24, contiguous with the free end of the center leg of the slot to facilitate the insertion of a link of the section of link chain 14 into the center leg 20 of the slot. A cross leg of the T-shaped slot comprises two oppositely extending portions 26 and 28, which are of different lengths relative to their zone of connection to the center leg 20 of the slot. As seen in the drawing, the longer portion 26 of the cross leg extends in an upwardly oblique direction, relative to the zone of its connection to the center leg of the slot.

It is to be understood that the dimensional relationship of the lengths of the respective portions 26 and 28 of the cross leg of the T-shaped slot are so related to the dimensions of a link of the link chain 14 so that a link of the chain may be passed through the center leg 22 of the slot, but the link cannot be initially rocked down into the smaller or lower portion 28 of the cross leg. It is necessary that the leading edge of the leg of the link be first rocked upwardly into the upper portion 26 of the cross leg of the slot until the trailing leg of the link registers in the cross leg of the slot, after which the link may then be moved downwardly so as to seat against the bottom of the lower portion 28 of the slot, as seen in FIG. 2, to detachably secure the chain in the slotted portion of the latch plate. Conversely, when it is desired to disengage the link of chain from the slot of the latch plate, the link seated in the cross leg of the slot will first have to be moved upwardly into the upper portion 26 of the slot so that the lower leg of the link is free to be moved into the center leg 20 of the slot and the link is then rocked into the center leg 20 in order to permit removal of the link of chain from latching engagement with respect to the latch plate 10.

As seen in FIG. 3 of the drawing, the initial link of the section of link chain 14 is fixedly secured in the notches 16 of the latch plate, and is permanently connected thereto. When the gate is in closed position, with the upright structural member D at the free end of the gate registering with the gate post B, the section of chain is caused to be trained snugly around the gate post and the intermediate link of the section of chain in approximate alignment with the open end of the center leg 20 of the T-shaped slot is moved into the T-shaped slot as above described, for detachably securing the gate in closed position with respect to the gate post B.

It will thus be apparent that, by reason of the compound or different motions that must be imparted to a link of the chain, seated in the T-shaped slot, as seen in FIG. 2, to effect its disengagement from the latch plate, it will be almost impossible for an animal to contact the link of chain in the latch plate in a manner to first move it obliquely upwardly in one direction, and then immediately thereafter to cause movement thereof at substantially right angles to the first direction of movement, in order that the link of chain might be accidentally forced out of the T-shaped slot.

It is to be understood that where it is desired to secure the gate in closed position against unauthorized opening, the section of chain, after it is trained around the gate post B, may have its free end link, or an intermediate link, brought into registration with one of the other links of the chain, and which links may then be connected together by a padlock.

While we have shown in the drawing a latch plate with a free edge portion 22 extending at approximately 45° to either of the mounting edges of the plate, and with the center leg 20 of the T-shaped slot 18 approximately normal to the free edge 22, it will be manifest that various other arrangements may be utilized to provide a latch plate that is relatively effective for the intended purpose. For example, the entire free edge portions of the latch plate could be of arcuate contour wherein the latch plate would be in the form of a segment, or the latch plate may be of generally rectangular outline.

We claim:

1. A latch plate for a gate having a plurality of horizontally extending structural members and a vertical structural member at the free end of the gate, said latch plate being flat and having one or more mounting edges for fixed securement to one or more of said structural members to position the plate in an upwardly extending direction, said latch plate being formed with a T-shaped slot therein with the free end of the center leg of the slot opening at a free edge portion of the plate, the cross leg of the T-shaped slot comprises two lateral portions of different lengths relative to the zone of connection to the center leg of the slot and the longer portion of the cross leg of the slot extending in an upwardly direction and the shorter portion of the cross leg of the slot extending in a downwardly direction with respect to the zone of connection to the center leg of the slot, the longer and shorter portions of the cross leg of the slot being of such proportional relationship to each other and to the external dimension of the minor axis of a link of a section of link chain to be used therewith so that said link may be moved through the center leg of the slot into the upwardly extending longer portion of the cross leg and then move downwardly into and seated in the shorter portion of the cross leg of the slot with a portion of said link, extending across the center leg of the slot for disengageably securing the link in the cross leg of the slot.

2. A latch plate as set forth in claim 1, wherein one of the mounting edges of the plate is formed for receiving a link of a link chain for fixedly attaching a portion of the chain relative to the plate.

3. A latch plate as set forth in claim 1, wherein one of the mounting edges of the plate is formed with a pair of spaced apart notches for receiving therein the side leg portions of a link of a link chain for fixedly attaching the chain relative to the plate.

* * * * *